United States Patent
Murata

(10) Patent No.: US 12,083,891 B1
(45) Date of Patent: Sep. 10, 2024

(54) IMAGE DISPLAY DEVICE

(71) Applicant: YAZAKI CORPORATION, Tokyo (JP)

(72) Inventor: Naohisa Murata, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/613,091

(22) Filed: Mar. 21, 2024

(30) Foreign Application Priority Data

Mar. 28, 2023 (JP) .................................. 2023-051042

(51) Int. Cl.
*B60K 35/234* (2024.01)

(52) U.S. Cl.
CPC ...... *B60K 35/234* (2024.01); *B60K 2360/349* (2024.01); *B60K 2360/688* (2024.01); *B60K 2360/691* (2024.01)

(58) Field of Classification Search
CPC ........ B60Q 35/21; B60Q 35/22; B60Q 35/23; B60Q 35/234
See application file for complete search history.

(56) References Cited

U.S. PATENT DOCUMENTS

| | | | |
|---|---|---|---|
| 2002/0021500 A1* | 2/2002 | Furuya | B60K 35/00 359/638 |
| 2019/0072800 A1* | 3/2019 | Narushima | G02B 27/01 |
| 2019/0235305 A1* | 8/2019 | Watanabe | G02B 27/0101 |
| 2022/0291505 A1 | 9/2022 | Murata et al. | |

FOREIGN PATENT DOCUMENTS

| | | |
|---|---|---|
| JP | 2019-139157 A | 8/2019 |
| JP | 2020-52070 A | 4/2020 |
| JP | 2022-137325 A | 9/2022 |

* cited by examiner

*Primary Examiner* — Thomas M Sember
(74) *Attorney, Agent, or Firm* — KENEALY VAIDYA LLP

(57) ABSTRACT

An image display device includes a display unit provided in a housing and emits display light, a reflection unit that reflects the display light and projects the display light on a display member, a first polarizing unit provided in the housing, is disposed on an optical path on which the display light passes, and polarizes, along a first polarization axis, external light made incident on the housing from the outside, a second polarizing unit provided in the housing, is disposed on the optical path, is rotatably provided centering on an axis along the optical path, and polarizes the external light along a second polarization axis. The image display device further includes an adjustment unit that rotates the second polarizing unit based on condensing information of the display unit and changes the direction of the second polarization axis to adjust a transmission amount of the external light on the optical path.

6 Claims, 5 Drawing Sheets

IMAGE DISPLAY DEVICE

CROSS-REFERENCE TO RELATED APPLICATION (S)

The present application claims priority to and incorporates by reference the entire contents of Japanese Patent Application No. 2023-051042 filed in Japan on Mar. 28, 2023.

BACKGROUND OF THE INVENTION

1. Field of the Invention

The present invention relates to an image display device for a vehicle.

2. Description of the Related Art

As an image display device, for example, as described in Japanese Patent Application Laid-open No. 2019-139157, Japanese Patent Application Laid-open No. 2020-052070, and Japanese Patent Application Laid-open No. 2022-137325, there has been known a head-up display (HUD) device that is mounted on a vehicle and emits display light from a display, projects the display light on a windshield or the like via a reflection mirror or the like, and causes a driver to visually recognize the display light as a virtual image.

Incidentally, in this head-up display device, when external light such as sunlight is made incident on the inside through an opening of the device and reaches the display via a reflection mirror or the like, the temperature of the display is likely to rise because of a condensing action of the reflection mirror or the like. As measures against this problem, it is conceivable to install a dimming device or a dimming member for adjusting the transmittance of light on an optical path of the display light. However, there is room for improvement in that measures against heat are insufficient.

SUMMARY OF THE INVENTION

Therefore, an object of the present invention is to provide an image display device that can appropriately suppressing a temperature rise of a display due to external light.

In order to achieve the above mentioned object, an image display device according to one aspect of the present invention includes a display unit that is provided in a housing and emits display light; a reflection unit that is provided in the housing and reflects the display light and project the display light onto a display member; a first polarizing unit that is provided in the housing, is disposed on an optical path on which the display light passes, and polarizes, along a first polarization axis, external light made incident on the housing from an outside; a second polarizing unit that is provided in the housing, is disposed on the optical path, is rotatably provided centering on an axis extending along the optical path, and polarizes the external light along a second polarization axis; and an adjustment unit that rotates the second polarizing unit based on condensing information concerning condensing of the external light on the display unit and changes a direction of the second polarization axis of the second polarizing unit with respect to the first polarization axis of the first polarizing unit to adjust a transmission amount of the external light on the optical path.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment according to the present invention is explained in detail with reference to the drawings. Note that the present invention is not limited by this embodiment. Constituent elements in the embodiment explained below include those that can be easily replaced by those skilled in the art or those that are substantially the same.

EMBODIMENT

The present embodiment relates to an image display device. Note that, in the following explanation, among a first direction, a second direction, and a third direction intersecting one another, the first direction is referred to as "front-rear direction X", the second direction is referred to as "vehicle width direction Y", and the third direction is referred to as "height direction Z". Here, the front-rear direction X, the vehicle width direction Y, and the height direction Z are orthogonal to one another. The front-rear direction X is equivalent to the front-rear direction of a vehicle on which the image display device is mounted. The vehicle width direction Y is equivalent to the vehicle width direction of the vehicle on which the image display device is mounted. The vehicle width direction Y and the height direction Z are equivalent to intersecting directions intersecting the front-rear direction X. Unless specifically noted otherwise, the directions used in the following explanation represent directions in a state in which the units are mounted on the vehicle. Note that "orthogonal" referred to herein includes "substantially orthogonal".

Figure 1:
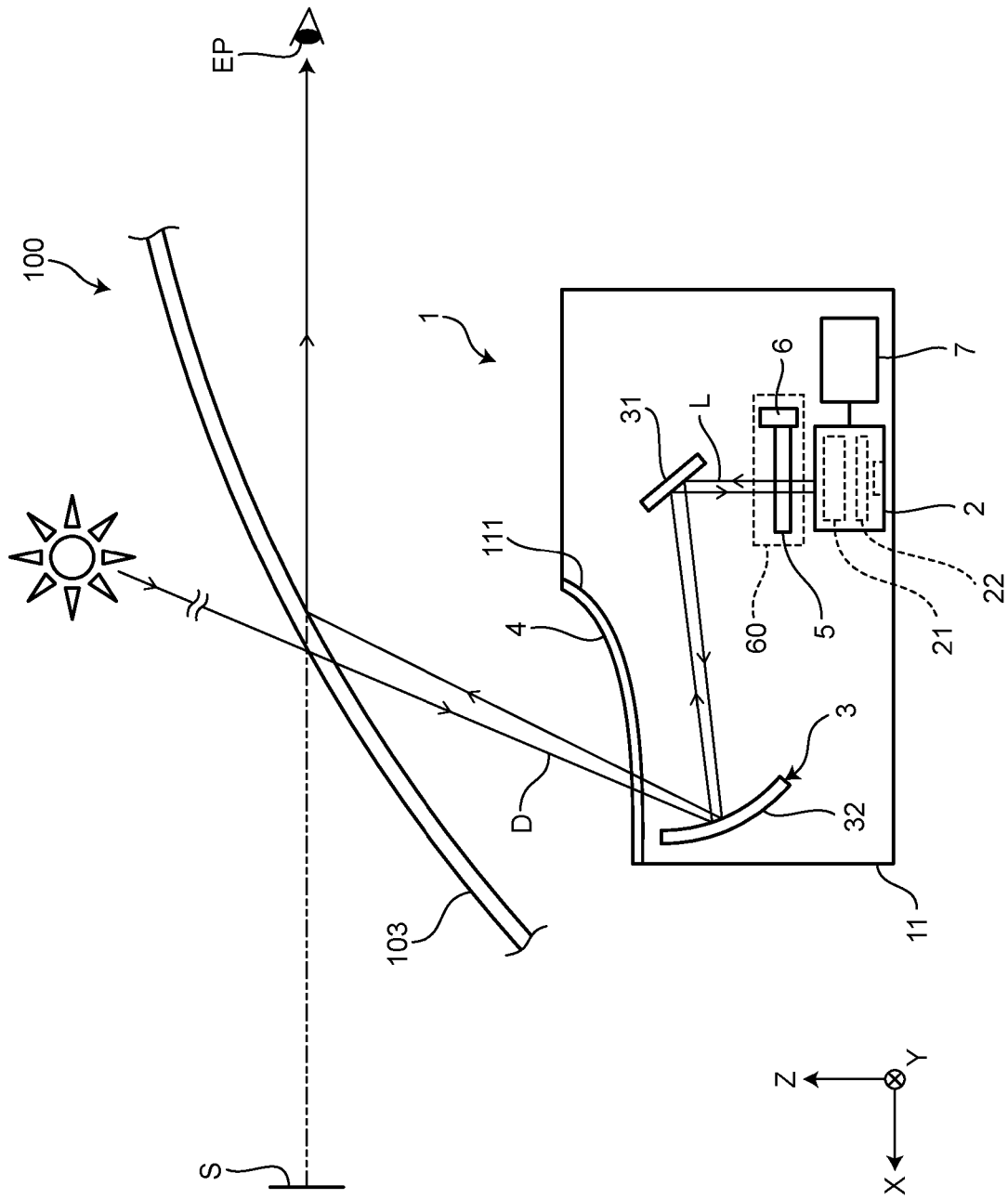
FIG. 1 is a diagram illustrating an overview of a configuration of an image display device according to an embodiment.

As illustrated in FIG. 1, an image display device 1 is a device that is installed in a vehicle and displays an image in the vehicle and is, for example, a head-up display device that displays an image on a display member 103 of the vehicle. In a vehicle 100, the image display device 1 projects a display image on the display member 103 and causes the display member 103 to display a virtual image S in front of an eye point EP of a driver of the vehicle. The display member 103 is, for example, a windshield. The image display device 1 is disposed below the display member 103. The eye point EP is assumed in advance as a visual point position of the driver.

The image display device 1 includes a display unit 2, a reflection unit 3, a first polarizing unit 4, a second polarizing unit 5, an adjustment unit 6, and a control unit 7. The display unit 2 is equipment that emits a display image as display light L and is provided, for example, in a housing 11 and includes a liquid crystal display unit 21 and a backlight unit 22. The housing 11 is a box-type housing body that houses components of the image display device 1. An opening 111 for emitting the display light L to the outside is formed in the housing 11. The liquid crystal display unit 21 is a so-called liquid crystal panel, and includes, for example, light transmission type or light semi-transmission type TFT liquid crystal (Thin Film Transistor Liquid Crystal). The liquid crystal display unit 21 is illuminated from a rear surface side, whereby a display surface on a front surface side emits light. The liquid crystal display unit 21 is disposed on an optical path of light emitted from the backlight unit 22 and is illuminated from the rear surface side, whereby the display surface on the front surface side emits light. The backlight unit 22 is illumination equipment that illuminates the liquid crystal display unit 21 from the rear surface side. The display unit 2 has a polarization axis 23 (see FIG. 6). For example, the polarization axis 23 of the display unit 2 is in the direction of a transmission axis of light of a polarizing plate provided in the liquid crystal display unit 21.

In FIG. 1, the reflection unit 3 is a member that reflects the display light L emitted from the display unit 2 and is provided, for example, in the housing 11 and reflects the display light L toward the display member 103. The reflection unit 3 includes, for example, a plane mirror 31 and a reflection mirror 32. The plane mirror 31 is a reflection unit that reflects the display light L emitted from the display unit 2 to the reflection mirror 32 and has, for example, a flat reflection surface and totally reflects the display light L emitted from the display unit 2 toward the reflection mirror 32 on the reflection surface. The plane mirror 31 is disposed, for example, at a position above display unit 2.

The reflection mirror 32 is a reflection unit that reflects the display light L reflected by the plane mirror 31 to the display member 103 and has, for example, a concave reflection surface. The reflection mirror 32 has the concave reflection surface to function as a magnifying mirror. That is, the reflection mirror 32 enlarges and reflects a display image of the display light L. That is, the display image of the display light L reflected by the reflection mirror 32 is relatively larger compared with the display image of the display light L before being reflected by the reflection mirror 32.

The reflection mirror 32 condenses external light D made incident on the inside of the housing 11 from the outside. That is, when the external light D such as sunlight is made incident on the inside of the housing 11 from the outside, the external light D is reflected and condensed by the reflection mirror 32. When the condensed external light D is directly made incident on the display unit 2, the temperature of the display unit 2 rises.

The first polarizing unit 4 is a plate-like member that is provided in the housing 11, is disposed on an optical path on which the display light L passes, and polarizes, along a first polarization axis 41 (see FIG. 6), the external light D made incident on the inside of the housing 11 from the outside of the image display device 1.

For example, a dustproof cover attached to cover the opening 111 of the housing 11 is used as the first polarizing unit 4. That is, the first polarizing unit 4 is configured by using a polarizing plate having a polarizing function as the dustproof cover. The first polarization axis 41 is an axis formed along a direction intersecting light made incident on the first polarizing unit 4 and is a transmission axis that transmits light vibrating in the same direction. That is, the first polarizing unit 4 transmits light vibrating in parallel to the first polarization axis 41 and, on the other hand, reflects light vibrating in a direction orthogonal to the first polarization axis 41. The first polarization axis 41 of the first polarizing unit 4 is set in the same direction as the polarization axis 23 of the display unit 2. For example, when the polarization axis 23 of the display unit 2 faces the vehicle width direction Y, the first polarization axis 41 of the first polarizing unit 4 is also formed to be in the vehicle width direction Y.

In FIG. 1, the second polarizing unit 5 is provided in the housing 11, is disposed on an optical path of the display light L, and is provided so as to be rotatable centering on an axis extending along the optical path. The second polarizing unit 5 is a plate-like member that polarizes the external light D along a second polarization axis 51 (see FIG. 6) and is provided, for example, on an optical path between the display unit 2 and the plane mirror 31. The second polarization axis 51 is an axis formed along a direction intersecting light made incident on the second polarizing unit 5 and is a transmission axis that transmits light vibrating in the same direction. That is, the second polarizing unit 5 transmits light vibrating in parallel to the second polarization axis 51 and reflects light vibrating in a direction orthogonal to the second polarization axis 51. The second polarization axis 51 of the second polarizing unit 5 is rotatable centering on the axis of the optical path by the rotation of the second polarizing unit 5. The adjustment unit 6 is a rotation mechanism that rotates the second polarizing unit 5 based on condensing information of the display unit 2. The adjustment unit 6 change the direction of the second polarization axis 51 of the second polarizing unit 5 with respect to the first polarization axis 41 of the first polarizing unit 4 to adjust a transmission amount of the external light D.

The second polarizing unit 5 is disposed, for example, between the display unit 2 and the plane mirror 31 and at a position closer to the display unit 2 compared with the plane mirror 31. In this case, the second polarizing unit 5 can be configured small by being disposed at a position close to the display unit 2. Further, by reducing the second polarizing unit 5 in size, a motor 63 (see FIG. 2) that rotates the second polarizing unit 5 can be reduced in size. Therefore, it is possible to achieve a reduction in the size of the image display device 1. In the image display device 1, by reducing the second polarizing unit 5 in size, a time required for the rotation of the second polarizing unit 5 can be reduced and adjustment control for the second polarization axis 51 of the second polarizing unit 5 can be quickly performed. When the second polarizing unit 5 is rotated at the time of a start of the image display device 1, a start time of the image display device 1 can be reduced.

Figure 2:
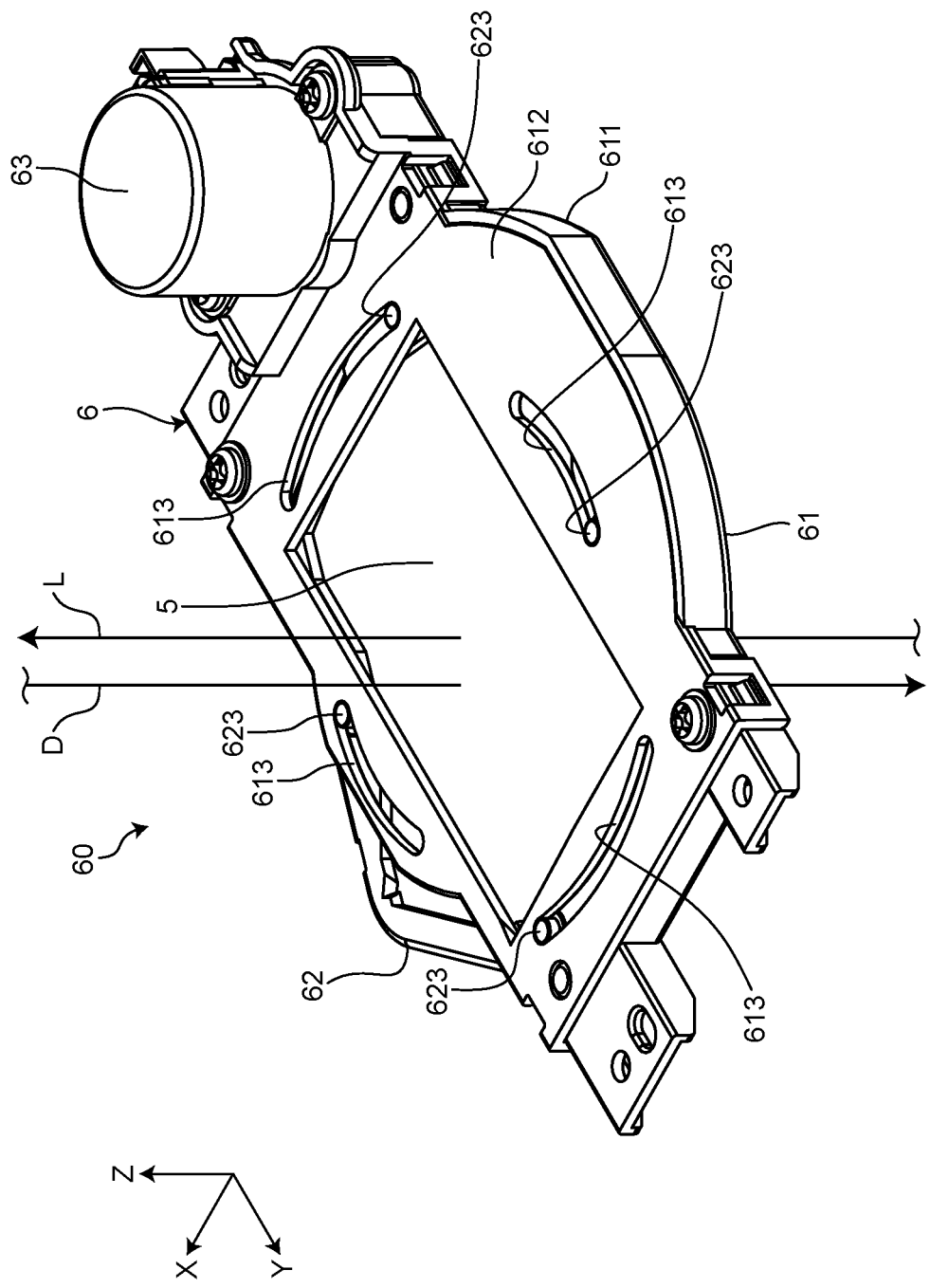
FIG. 2 is a perspective view of a polarization unit in the image display device according to the embodiment.
Figure 3:
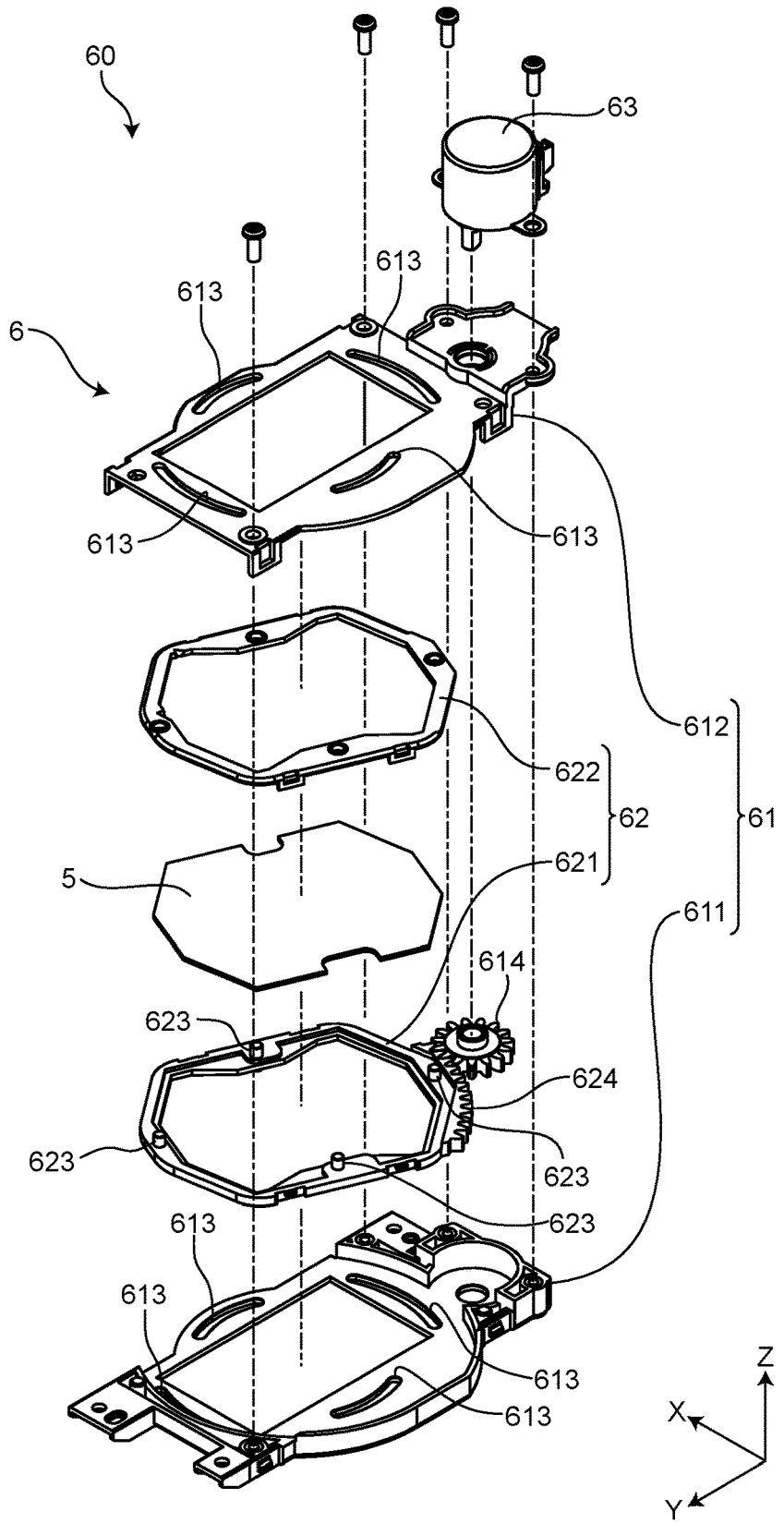
FIG. 3 is an exploded perspective view of the polarization unit in the image display device according to the embodiment.

As illustrated in FIGS. 2 and 3, the second polarizing unit 5 and the adjustment unit 6 are, for example, provided to be incorporated in a polarization unit 60. The polarization unit 60 included the second polarizing unit 5 and the adjustment unit 6, and the adjustment unit 6 rotatably holds the second polarizing unit 5.

The adjustment unit 6 includes, for example, a main body 61, a holding frame 62, and a motor 63. The holding frame 62 is a frame that holds the second polarizing unit 5 and rotates together with the second polarizing unit 5. The holding frame 62 is configured by, for example, an annular frame main body 621 and a support unit 622. The second polarizing unit 5 is fit in the frame main body 621 and fixed to the frame main body 621 by the support unit 622. The main body 61 includes a main body unit 611 and a lid 612 that form an opening at the center. The main body 61 sandwiches the holding frame 62, which holds the second polarizing unit 5, between the main body unit 611 and the lid 612 and rotatably holds the holding frame 62. For example, a plurality of arcuate slits 613 are formed in the main body unit 611 and the lid 612. A plurality of pins 623 are protruded in the frame main body 621. The pins 623 are into the slits 613, whereby the second polarizing unit 5 and the holding frame 62 are capable of rotating with an extending direction of the slits 613 as a circumferential direction.

A rack 624 including a plurality of teeth is formed on the outer periphery of frame main body 621. The rack 624 meshes with a gear 614 rotatably attached to the main body unit 611. The gear 614 is attached to a rotating shaft of the motor 63 attached to the lid 612. Therefore, the gear 614 rotates according to rotational drive of the motor 63 and the second polarizing unit 5 and the holding frame 62 rotate via the rack 624. The motor 63 is driven based on a control signal of the control unit 7. Note that the second polarizing unit 5 and the adjustment unit 6 may be configured to be capable of rotating the second polarizing unit 5 by a mechanism other than the polarization unit 60 explained above.

Figure 4:
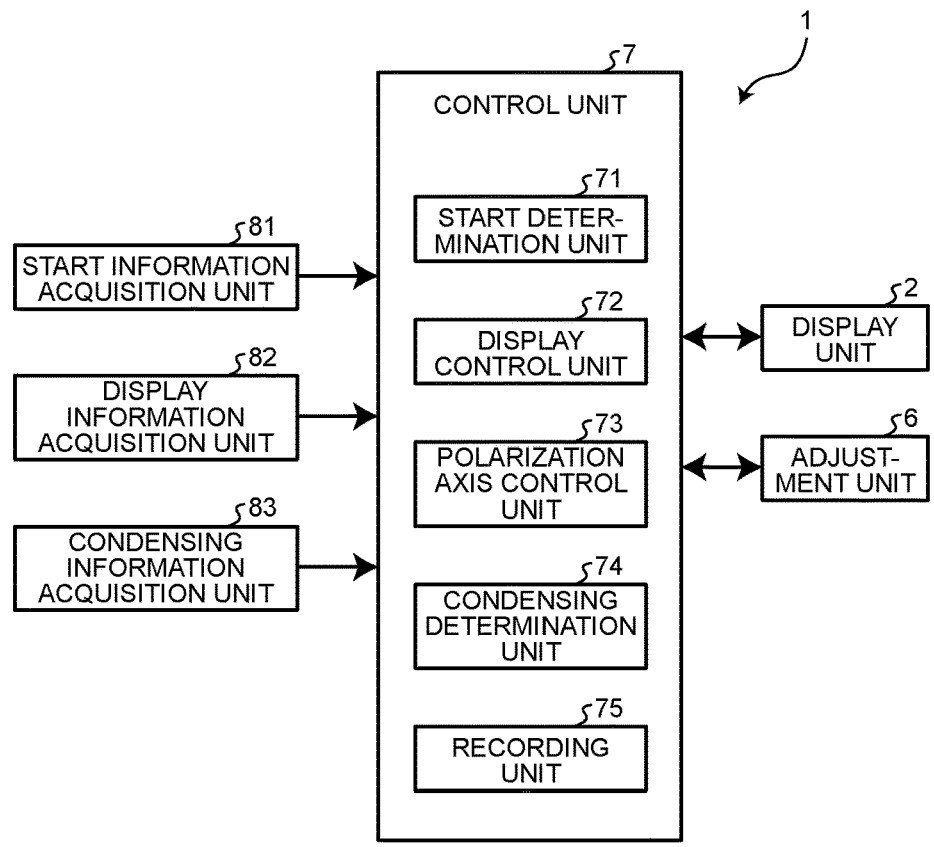
FIG. 4 is a block diagram illustrating an electrical configuration of the image display device according to the embodiment.

As illustrated in FIG. 4, the image display device 1 includes, as electrical components, a start information acquisition unit 81, a display information acquisition unit 82, a condensing information acquisition unit 83, the control unit 7, the display unit 2, and the adjustment unit 6. A start determination unit 71, a display control unit 72, a polarization axis control unit 73, and a condensing determination unit 74 may be configured by a program or software introduced into the control unit 7 or may be installed as a separate unit that performs control processing.

The start information acquisition unit 81 acquires start information of the image display device 1. For example, an ignition switch for starting an engine, a vehicle start switch, a power switch, or the like is used as the start information acquisition unit 81. When a power switch for turning on and off the image display device 1 is provided, the start information acquisition unit 81 may be the power switch. The start information includes information concerning an operation end of the image display device 1 besides information concerning an operation start of the image display device 1. The start information acquisition unit 81 is connected to the control unit 7 and inputs the start information to the control unit 7.

The display information acquisition unit 82 acquires information or data of a display image to be displayed on the image display device 1. For example, an image display control unit installed on the outside of the control unit 7 corresponds to the display information acquisition unit 82. The display information acquisition unit 82 is connected to the control unit 7 and inputs display information to the control unit 7. Note that the display information acquisition unit 82 may be provided on the inside of the control unit 7. For example, the control unit 7 may record, in advance, display image data to be displayed and receive a display command signal and output display image data corresponding to the display command signal.

The condensing information acquisition unit 83 acquires condensing information of the display unit 2. For example, a sensor that detects that the external light D is condensed on the display unit 2 is used as the condensing information acquisition unit 83. The external light D is light made incident on the housing 11 from the outside of the image display device 1 and is, for example, sunlight. The condensing information is information concerning the condensing of the external light D on the display unit 2. For example, detection information of the condensing of the external light D such as the illuminance of light on the display unit 2 and the temperature of the display unit 2 and information with which the condensing of the external light D can be estimated corresponds to the condensing information. When the external light D is transmitted through the first polarizing unit 4, reflected by the reflection mirror 32 and the plane mirror 31, and emitted to the display unit 2, the external light D is emitted to be condensed on the display unit 2. When the external light D is condensed on the display unit 2, the temperature of the display unit 2 increases. As the condensing information acquisition unit 83, for example, a temperature sensor that detects the temperature of the display unit 2, an infrared sensor and an optical sensor that detect light emitted to the display unit 2, and the like are used. The condensing information acquisition unit 83 is connected to the control unit 7 and inputs condensing information to the control unit 7.

The control unit 7 is an electronic control unit that controls the entire image display device 1 and is configured by, for example, a computer including a CPU (Central Processing Unit) that executes control processing, a ROM (Read Only Memory) that records programs and data necessary for the control, a RAM (Random Access Memory) that temporarily records an arithmetic operation result and the like in the CPU, and an input and output port for inputting and outputting signals between the control unit 7 and the outside.

The control unit 7 includes the start determination unit 71, the display control unit 72, the polarization axis control unit 73, the condensing determination unit 74, and a recording unit 75. For example, the start determination unit 71 determines, based on the start information of the start information acquisition unit 81, whether to start the image display device 1 and, at the time of the operation of the image display device 1, determines whether to end the operation. For example, the display control unit 72 outputs an image signal to the display unit 2 based on the display information of the display information acquisition unit 82.

The condensing determination unit 74 determines whether the external light D is condensed on the display unit 2 and, for example, determines a condensing state of the external light D based on the condensing information of the condensing information acquisition unit 83. The polarization axis control unit 73 controls the direction of the second polarization axis 51 of the second polarizing unit 5 and, for example, outputs a control signal to the adjustment unit 6 based on the determination information of the condensing determination unit 74 and the start information of the start information acquisition unit 81.

Figure 6:
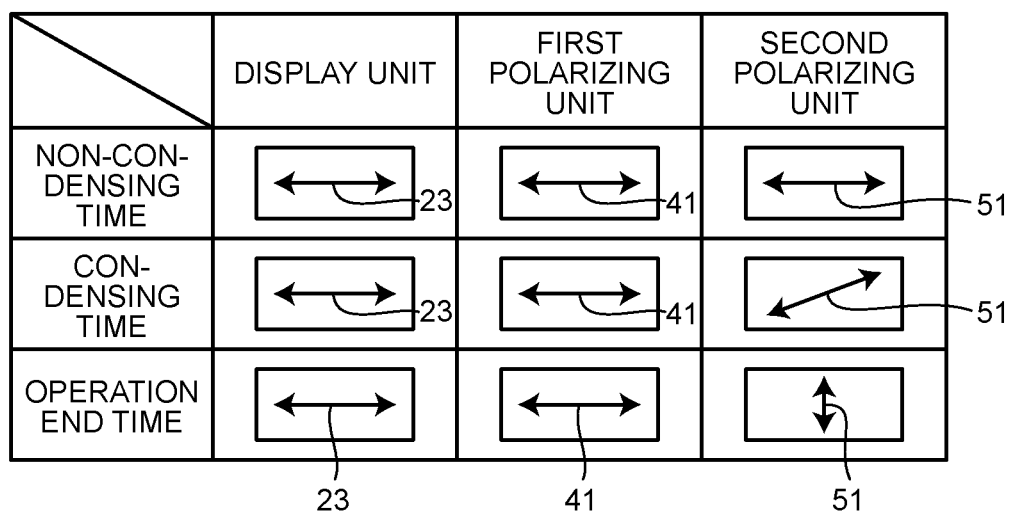
FIG. 6 is a diagram illustrating directions of polarization axes in a display unit, a first polarizing unit, and a second polarizing unit in the image display device according to the embodiment.

Specifically, as illustrated in FIG. 6, when the condensing determination unit 74 determines that the external light D is not condensed on the display unit 2, the polarization axis control unit 73 outputs a control signal to the adjustment unit 6 to align the direction of the second polarization axis 51 of the second polarizing unit 5 with the direction of the first polarization axis 41 of the first polarizing unit 4. Note that, as illustrated in FIG. 6, the first polarization axis 41 of the first polarizing unit 4 is in the same direction as the polarization axis 23 of the display unit 2 and is in a fixed direction without rotating. The adjustment unit 6 receives the control signal, drives the motor 63, and rotates the second polarizing unit 5 such that the second polarization axis 51 of the second polarizing unit 5 is in the same direction as the first polarization axis 41 of the first polarizing unit 4. Consequently, the second polarizing unit 5 changes a transmission amount of the external light D to a high transmission state. Note that the same direction includes substantially the same direction.

When the condensing determination unit 74 determines that the external light D is condensed on the display unit 2, the polarization axis control unit 73 outputs a control signal to the adjustment unit 6 to direct the second polarization axis 51 of the second polarizing unit 5 in a direction intersecting the first polarization axis 41 of the first polarizing unit 4. In this case, the intersecting direction is a direction in which an angle formed by the first polarization axis 41 and the second polarization axis 51 is larger than 0 degree and smaller than 90 degrees. The angle formed by the first polarization axis 41 and the second polarization axis 51 may be controlled to be larger as a condensing degree of the external light D is larger. The adjustment unit 6 receives the control signal, drives the motor 63, and rotates the second polarizing unit 5 such that the second polarization axis 51 of the second polarizing unit 5 is in the direction intersecting the first polarization axis 41 of the first polarizing unit 4. Consequently, the second polarizing unit 5 changes the transmission amount of the external light D to a low transmission state.

When the start determination unit 71 determines to end the operation of the image display device 1, the polarization axis control unit 73 outputs a control signal to the adjustment unit 6 to direct the second polarization axis 51 of the second polarizing unit 5 in a direction orthogonal to the first polarization axis 41 of the first polarizing unit 4. In this case, the orthogonal direction includes a substantially orthogonal direction. The adjustment unit 6 receives the control signal, drives the motor 63, and rotates the second polarizing unit 5 such that the second polarization axis 51 of the second polarizing unit 5 is in a direction orthogonal to the first polarization axis 41 of the first polarizing unit 4. Consequently, the second polarizing unit 5 sets the transmission amount of the external light D to a blocked state.

In FIG. 4, the recording unit 75 is a memory that records control data and the like of the image display device 1. For example, an operation amount of the motor 63 corresponding to the angle of the second polarization axis 51 of the second polarizing unit 5 in FIG. 6 is recorded in the recording unit 75. The display unit 2 emits the display light L based on the control signal of the display control unit 72. The adjustment unit 6 operates based on a control signal of the polarization axis control unit 73 and drives the motor 63 to rotate the second polarizing unit 5.

Next, an operation of the image display device 1 according to the present embodiment is explained.

First, a basic operation of the image display device 1 is explained. In FIG. 1, the display unit 2 emits the display light L based on an image signal output from the control unit 7. The display light L is reflected by the plane mirror 31 and the reflection mirror 32 and projected on the display member 103. The driver of the vehicle can visually recognize an image of the display light L projected at the eye point EP as the virtual image S.

On the other hand, when the external light D is made incident on the image display device 1, it is necessary to prevent the external light D from being condensed on the display unit 2. This is because the temperature of the display unit 2 rises because of the condensing of the external light D. In the image display device 1, the first polarizing unit 4 and the second polarizing unit 5 are installed on the optical path of the display light L and polarization axis control processing is performed to suppress the temperature rise of the display unit 2.

Figure 5:
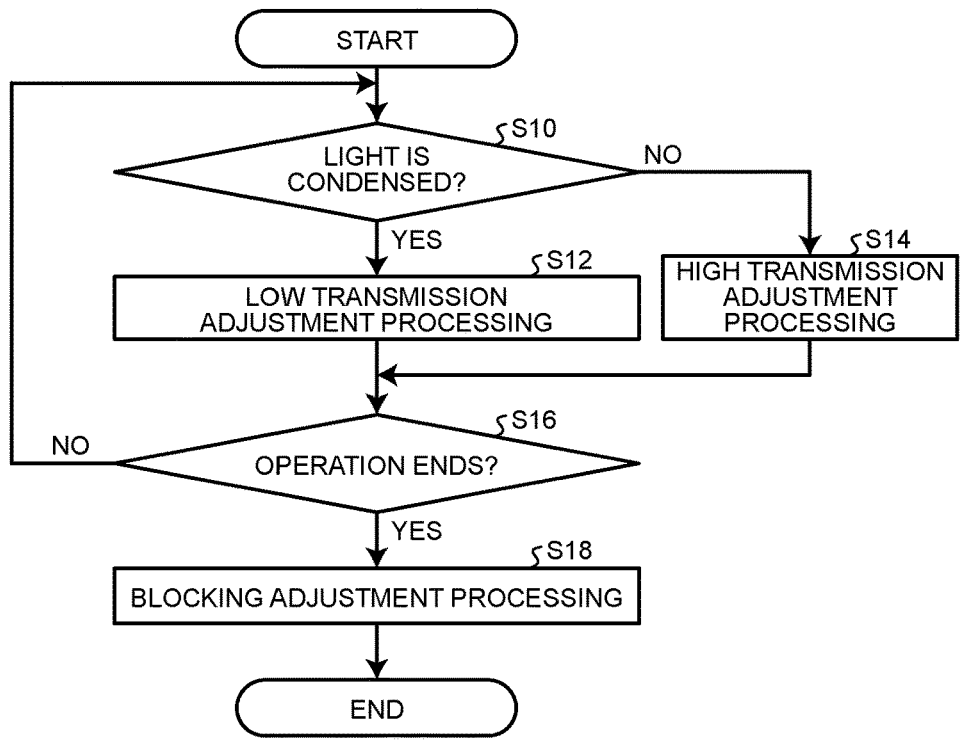
FIG. 5 is a flowchart illustrating polarization axis control processing of the image display device according to the embodiment.

FIG. 5 is a flowchart illustrating the polarization axis control processing of the image display device 1. The polarization axis control processing illustrated in FIG. 5 is started, for example, when the vehicle is started and is executed by the control unit 7.

First, step S10 (hereinafter, simply referred to as "S10". The same applies to steps after step S10), it is determined whether the external light D is condensed on the display unit 2. This determination processing is processing of determining, based on the condensing information of the condensing information acquisition unit 83, whether the external light D is condensed on the display unit 2 and is performed by, for example, the condensing determination unit 74.

When it is determined in S10 that the external light D is not condensed on the display unit 2, high transmission adjustment processing is performed (S14). The high transmission adjustment processing is processing of rotating the second polarizing unit 5 such that the second polarization axis 51 of the second polarizing unit 5 is in the same direction as the first polarization axis 41 of the first polarizing unit 4 and is performed by, for example, the polarization axis control unit 73. For example, in FIG. 4, a control signal is output from the polarization axis control unit 73 to the adjustment unit 6.

Consequently, in FIG. 2, the motor 63 operates and the second polarizing unit 5 rotates centering on an axis extending along the optical path of the display light L. Then, in FIG. 6, the second polarization axis 51 of the second polarizing unit 5 is set in the same direction as the first polarization axis 41 of the first polarizing unit 4 and the transmission amounts of the display light L and the external light D changes to a high transmission state on the optical path of the display light L. Therefore, the display light L is projected on the display member 103 almost without being reflected or attenuated by the second polarizing unit 5. Therefore, a luminance decrease hardly occurs in a display image by the display light L and image display is satisfactorily performed.

On the other hand, when it is determined in S10 in FIG. 5 that the external light D is condensed on the display unit 2, low transmission adjustment processing is performed (S12). The low transmission adjustment processing is processing of rotating the second polarizing unit 5 such that the second polarization axis 51 of the second polarizing unit 5 is in the direction intersecting the first polarization axis 41 of the first polarizing unit 4 and is performed by, for example, the polarization axis control unit 73. For example, in FIG. 4, a control signal is output from the polarization axis control unit 73 to the adjustment unit 6. Consequently, in FIG. 2, the motor 63 operates and the second polarizing unit 5 rotates centering on an axis extending along the optical path of the display light L. In FIG. 6, the second polarization axis 51 of the second polarizing unit 5 is set in the direction intersecting the first polarization axis 41 of the first polarizing unit 4 and the transmission amounts of the display light L and the external light D change to a low transmission state on the optical path of the display light L. Therefore, the external light D is changed to a polarization state in the first polarizing unit 4, polarized in different directions by the second polarizing unit 5 to be almost attenuated, and hardly reaches the display unit 2. Therefore, condensing of the external light D is suppressed in the display unit 2 and a temperature rise due to the external light D of the display unit 2 is appropriately suppressed. Note that the low transmission adjustment processing may be released after a preset time elapses or may be released according to a change in a traveling direction of the vehicle, a change in weather, or the like.

Then, when the low transmission adjustment processing in S12 and the high transmission adjustment processing in S14 are finished, it is determined whether to end the operation of the image display device 1 (S16). This determination processing is processing of determining, based on the start information of the start information acquisition unit 81, whether to end the operation of the image display device 1 and is performed by, for example, the start determination unit 71. That is, when information such as ignition off or start switch off is included as the start information, the start determination unit 71 determines to end the operation of the image display device 1. On the other hand, when information such as ignition off or start switch off is not included as the start information, the start determination unit 71 determines not to end the operation of the image display device 1.

When it is determined in S16 not to end the operation of the image display device 1, the control processing returns to S10. On the other hand, when it is determined in S16 to end the operation of the image display device 1, the control processing shifts to S18 and blocking adjustment processing is performed. The blocking adjustment processing is processing of rotating the second polarizing unit 5 such that the second polarization axis 51 of the second polarizing unit 5 is in a direction orthogonal to the first polarization axis 41 of the first polarizing unit 4 and is performed by, for example, the polarization axis control unit 73. For example, in FIG. 4, a control signal is output from the polarization axis control unit 73 to the adjustment unit 6. Consequently, in FIG. 2, the motor 63 operates and the second polarizing unit 5 rotates centering on an axis extending along the optical path of the display light L. In FIG. 6, the second polarization axis 51 of the second polarizing unit 5 is set in the direction orthogonal to the first polarization axis 41 of the first polarizing unit 4 and the transmission amounts of the display light L and the external light D change to the blocked state on the optical path of the display light L. Therefore, the external light D is hardly transmitted along the optical path of the display light L by the first polarizing unit 4 and the second polarizing unit 5. Therefore, when the image display device 1 is not operated, condensing of the external light D is suppressed on the display unit 2 and a temperature rise due to the external light D of the display unit 2 is appropriately suppressed. When the processing in S18 is finished, a series of control processing of FIG. 5 is ended.

As explained above, the image display device 1 according to the present embodiment can accurately prevent the external light D from being condensed on the display unit 2 by changing the direction of the second polarization axis 51 of the second polarizing unit 5 with respect to the first polarization axis 41 of the first polarizing unit 4 and adjusting the transmission amount of the external light D on the optical path of the display unit 2. Therefore, the image display device 1 according to the present embodiment can appropriately suppress a temperature rise of the display unit 2.

When the external light D is condensed on the display unit 2, the image display device 1 according to the present embodiment rotates the second polarizing unit 5 so that the second polarization axis 51 intersects the first polarization axis 41. Consequently, it is possible to reduce the transmission amount of the external light D on the optical path of the display light L and suppress a temperature rise of the display unit 2.

The image display device 1 according to the present embodiment rotates the second polarizing unit 5 such that the second polarization axis 51 is orthogonal to the first polarization axis 41 at the end of the operation.

Consequently, when the image display device 1 is not in operation, it is possible to reduce the transmission amount of the external light D on the optical path of the display light L and suppress a temperature rise of the display unit 2.

Further, in the image display device 1 according to the present embodiment, the second polarizing unit 5 is disposed between the display unit 2 and the reflection unit 3 and at a position closer to the display unit 2 compared with the reflection unit 3. Therefore, it is possible to achieve a reduction in the size of the second polarizing unit 5 and a reduction in the size of the motor 63. Therefore, it is possible to achieve a reduction in the size of the entire image display device 1. In the image display device 1 according to the present embodiment, by reducing the second polarizing unit 5 in size, it is possible to quickly perform adjustment control for the second polarization axis 51 of the second polarizing unit 5 and accurately suppress a temperature rise of the display unit 2.

Note that the image display device according to the present invention is not limited to the embodiment explained above. Various modifications can be made within the scope described in the claims. The image display device according to the present embodiment may be configured by combining, as appropriate, the components of the embodiments and modifications explained above.

For example, in the embodiment explained above, the case in which the plane mirror 31 and the reflection mirror 32 are provided as the reflection unit 3 is explained. However, the plane mirror 31 may not be installed in the reflection unit 3 and only the reflection mirror 32 may be provided. In addition, a mirror other than the plane mirror 31 and the reflection mirror 32 may be provided as the reflection unit 3. Even with such an image display device, it is possible to obtain the same action effects as those of the image display device 1 according to the embodiment explained above. That is, since the image display device includes the first polarizing unit 4 and the second polarizing unit 5, it is possible to accurately prevent the external light D from being condensed on the display unit 2. It is possible to appropriately suppress a temperature rise of the display unit 2.

In the embodiment explained above, the case in which the display light L is projected on the windshield serving as the display member 103 is explained. However, the display light L may be projected on an object other than the windshield such as a combiner serving as the display member 103. Even in such an image display device, as in the image display device 1 according to the embodiment explained above, since the first polarizing unit 4 and the second polarizing unit 5 are provided, it is possible to accurately prevent the external light D from being condensed on the display unit 2. It is possible to appropriately suppress a temperature rise of the display unit 2.

In the embodiment explained above, the case in which the first polarizing unit 4 is provided at the position of the opening 111 of the housing 11 and the second polarizing unit 5 is provided between the reflection unit 3 and the display unit 2 is explained. However, the first polarizing unit 4 and the second polarizing unit 5 may be provided at other positions. Even in such an image display device, as in the image display device 1 according to the embodiment explained above, since the first polarizing unit 4 and the second polarizing unit 5 are provided, it is possible to accurately prevent the external light D from being condensed on the display unit 2. It is possible to appropriately suppress a temperature rise of the display unit 2.

With the image display device according to the present embodiment, it is possible to appropriately suppress a temperature rise of the display due to the external light.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image display device comprising:
  a display unit that is provided in a housing and emits display light;
  a reflection unit that is provided in the housing and reflects the display light and project the display light onto a display member;
  a first polarizing unit that is provided in the housing, is disposed on an optical path on which the display light passes, and polarizes, along a first polarization axis, external light made incident on the housing from an outside;
  a second polarizing unit that is provided in the housing, is disposed on the optical path, is rotatably provided centering on an axis extending along the optical path, and polarizes the external light along a second polarization axis; and
  an adjustment unit that rotates the second polarizing unit based on condensing information concerning condensing of the external light on the display unit and changes a direction of the second polarization axis of the second polarizing unit with respect to the first polarization axis of the first polarizing unit to adjust a transmission amount of the external light on the optical path.

2. The image display device according to claim 1, further comprising:
  a condensing determination unit that determines, based on the condensing information of the display unit, whether the external light is condensed on the display unit, wherein
  when the condensing determination unit determines that the external light is not condensed on the display unit, the adjustment unit rotates the second polarizing unit to align a direction of the second polarization axis with the first polarization axis, and
  when the condensing determination unit determines that the external light is condensed on the display unit, the adjustment unit rotates the second polarizing unit such that that the second polarization axis is in a direction intersecting the first polarization axis and reduces the transmission amount of the external light compared with when the direction of the second polarization axis is aligned with the first polarization axis.

3. The image display device according to claim 2, wherein when an operation is ended, the adjustment unit rotates the second polarizing unit such that the second polarization axis is in a direction orthogonal to the first polarization axis.

4. The image display device according to claim 2, wherein the first polarizing unit is provided to cover an opening that is formed in the housing and on which the display light is emitted to the outside, and
the second polarizing unit is disposed between the display unit and the reflection unit and at a position closer to the display unit compared with the reflection unit.

5. The image display device according to claim 1, wherein when an operation is ended, the adjustment unit rotates the second polarizing unit such that the second polarization axis is in a direction orthogonal to the first polarization axis.

6. The image display device according to claim 1, wherein the first polarizing unit is provided to cover an opening that is formed in the housing and on which the display light is emitted to the outside, and
the second polarizing unit is disposed between the display unit and the reflection unit and at a position closer to the display unit compared with the reflection unit.

* * * * *